(12) United States Patent
Cui et al.

(10) Patent No.: US 11,598,923 B2
(45) Date of Patent: Mar. 7, 2023

(54) FIBER OPTICAL CONNECTOR

(71) Applicant: ACON OPTICS COMMUNICATIONS INC., New Taipei (TW)

(72) Inventors: Yang-Yang Cui, New Taipei (TW); Yan-Mei Chang, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 0 days.

(21) Appl. No.: 17/445,369

(22) Filed: Aug. 18, 2021

(65) Prior Publication Data

US 2021/0382246 A1 Dec. 9, 2021

Related U.S. Application Data

(63) Continuation of application No. 16/845,393, filed on Apr. 10, 2020, now Pat. No. 11,125,953.

(30) Foreign Application Priority Data

Apr. 11, 2019 (CN) .......................... 201920485628.3
Apr. 7, 2020 (CN) .......................... 202010264114.2

(51) Int. Cl.
  *G02B 6/38* (2006.01)
(52) U.S. Cl.
  CPC ......... *G02B 6/3869* (2013.01); *G02B 6/3888* (2021.05); *G02B 6/3893* (2013.01); *G02B 6/3879* (2013.01)

(58) Field of Classification Search
  CPC .. G02B 6/3869; G02B 6/3879; G02B 6/3888; G02B 6/3893
  See application file for complete search history.

(56) References Cited

U.S. PATENT DOCUMENTS

| | | | |
|---|---|---|---|
| 8,047,726 B2* | 11/2011 | Tamekuni | G02B 6/38875 385/98 |
| 8,070,367 B2* | 12/2011 | Winberg | G02B 6/3846 385/75 |
| 8,573,859 B2* | 11/2013 | Larson | G02B 6/3846 385/86 |

(Continued)

*Primary Examiner* — Ryan A Lepisto
(74) *Attorney, Agent, or Firm* — Innovation Capital Law Group, LLP; Vic Lin (57) ABSTRACT

A fiber optical connector includes a connector housing and an optical-fiber component. The connector housing comprises a receiving space. One end of the connector housing forms a connector opening communicating with the receiving space. Two side walls of the connector housing comprise a plurality of buckling portions adjacent to the connector opening. The optical-fiber component is positioned in the receiving space. The optical-fiber component comprises a sleeve piece. The sleeve piece comprises a block member and a threaded portion. The block member is assembled in the connector opening and the block member fully received inside the receiving space. Two sides of the block member respectively form an engaging portion. Each of the engaging portions is engaged with the corresponding buckling portion, and the threaded portion is exposed on the peripheral surface of a tail portion of the sleeve piece and out of the connector opening.

12 Claims, 9 Drawing Sheets

(56) References Cited

U.S. PATENT DOCUMENTS

| | | | | |
|---|---|---|---|---|
| 8,876,405 B2* | 11/2014 | Larson | ............ | G02B 6/3887 |
| | | | | 385/86 |
| 9,285,559 B1* | 3/2016 | Stockton | ............ | G02B 6/4465 |
| 10,705,300 B2* | 7/2020 | Takano | ............ | G02B 6/387 |
| 10,838,152 B2* | 11/2020 | Chang | ............ | G02B 6/3831 |
| 11,125,953 B2* | 9/2021 | Cui | ............ | G02B 6/3869 |
| 2018/0292616 A1* | 10/2018 | Chang | ............ | G02B 6/3898 |
| 2019/0310432 A1* | 10/2019 | Chang | ............ | G02B 6/3878 |

* cited by examiner

FIBER OPTICAL CONNECTOR

CROSS-REFERENCE TO RELATED APPLICATION

This application is a continuation application Ser. No. 16/845,393, filed on Apr. 10, 2020 with claiming foreign priority of Patent Application No. 201920485628.3 filed in China, P.R.C. on Apr. 11, 2019 and Patent Application No. 202010264114.2 filed in China, P.R.C. on Apr. 7, 2020. The prior application is herewith incorporated by reference in its entirety.

FIELD OF THE INVENTION

The instant disclosure relates to a connector, and more particular to a fiber optical connector.

BACKGROUND

The optical fiber is an tool for optical transmission. In general, a fiber optical connection device includes a female adapter with two ends being inserted by male fiber optical connectors, so that the adapter and the connectors can be fixed with each other, and data transmission can be performed between electronic devices connected through the fiber optical connection device.

SUMMARY OF THE INVENTION

Figure 1:
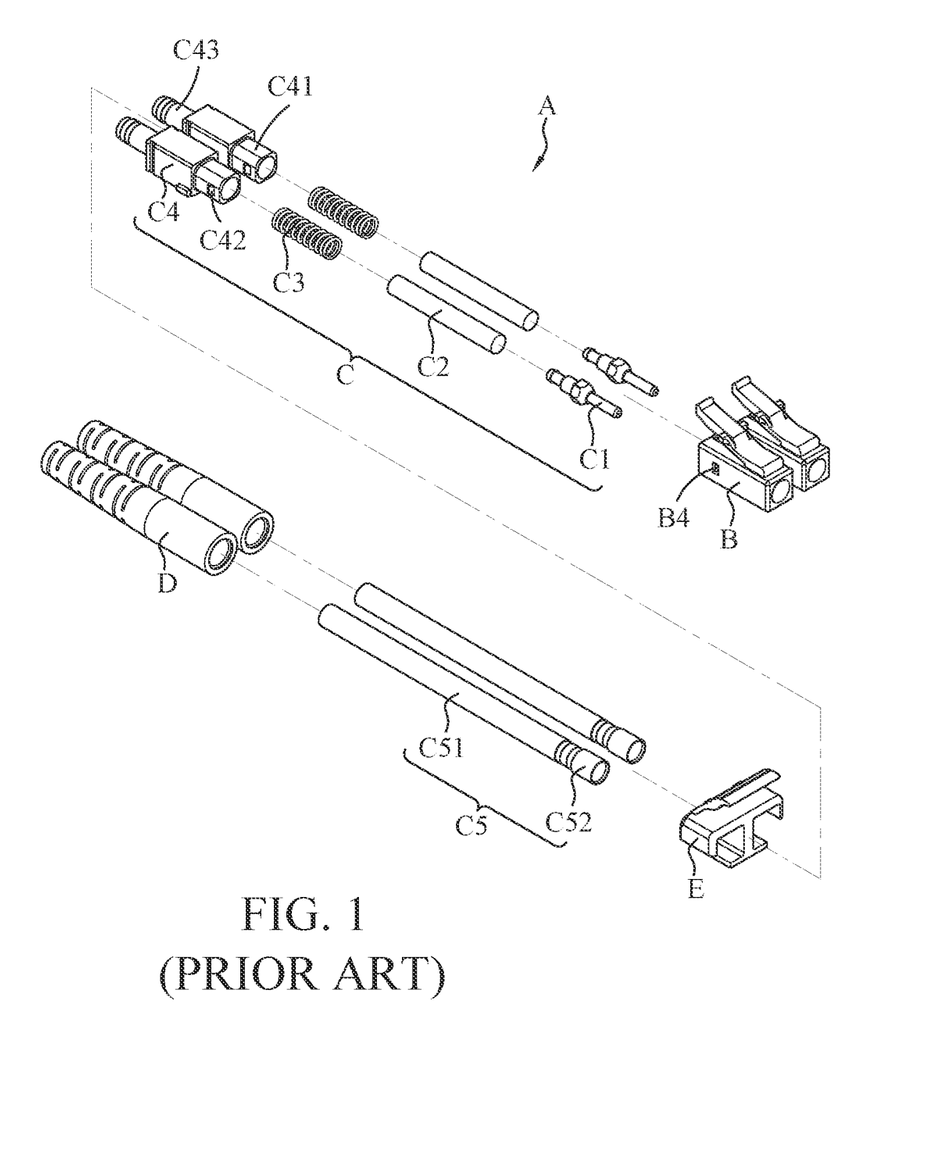
FIG. 1 illustrates an exploded view of a prior-art fiber optical connector.
Figure 2:
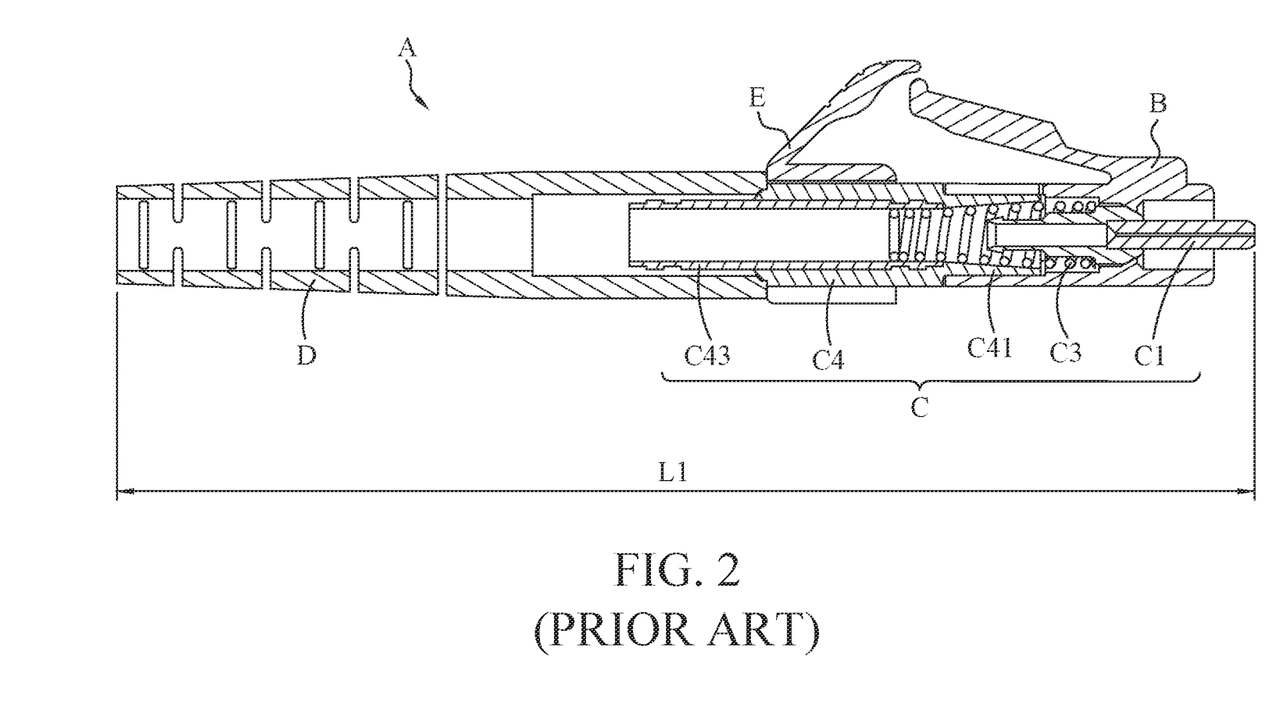
FIG. 2 illustrates a side cross-sectional view of the prior-art fiber optical connector.

Please refer to FIGS. 1 and 2. FIG. 1 illustrates an exploded view of a fiber optical connector known to the inventor (called prior-art fiber optical connector), and FIG. 2 illustrates a side cross-sectional view of the prior-art fiber optical connector. The prior-art fiber optical connector A includes a housing B, an optical-fiber component C, a tail cap D, and a pressing member E. The optical-fiber component C comprises, from front to rear, an insertion core C1, a core component C2, a spring C3, a sleeve piece C4, and a sleeve piece C5. The insertion core C1 extends out of one of two ends of the housing B, and the tail cap D is fixed at the other end of the housing B. The sleeve piece C5 has a long sleeve C51 for thermal shrinking (the length of the long sleeve C51 is not counted for the total length of the fiber optical connector A from the front end of the insertion core C1 to the rear end of the tail cap D) and a metallic sleeve C52 at one side of the long sleeve C51. The length of the metallic sleeve C52 is 6.85 mm, and the length of the tail cap D is 28.8 mm.

The main body of the sleeve piece C4 is a block. A protruding tubular member C41 (tubular body) extends from one end of the main body of the sleeve piece C4, and a metallic tubular member C43 extends from the other end of the main body of the sleeve piece C4. An outer surface of the protruding tubular member C41 has an engaging block C42. The protruding tubular member C41 is assembled in the housing B, the engaging block C42 is inflexibly engaged with the buckling groove B4 at the side portion of the housing B, and the main body of the sleeve piece C4 is positioned outside the housing B. The length of the sleeve piece C4 is 18.22 mm.

After the prior-art fiber optical connector A is assembled, the length from the front end of the insertion core C1 to the rear end of the tail cap D is 45 mm, which is the total length L1 of the prior-art fiber optical connector A. Moreover, it is understood that, the components of the prior-art fiber optical connector A are assembled with each other by inflexible engagement. When the prior-art fiber optical connector A is applied to fix with an optical-fiber cable, the jacket of the optical-fiber cable has to be teared apart, and then a compression ring member and a tubular member are applied to fix the optical-fiber lines and the jacket. Moreover, the interior of the housing B and the insertion core C1 are of a hexagonal shape, with the housing B assembled with the insertion core C1 in a tapered engaging manner. During the metal processing, because of the wear and tear of the processing knives, precisions on the angles of the metallic components of the prior-art fiber optical connector A cannot be controlled properly, resulting in that the components of the prior-art fiber optical connector A cannot be properly mated with each other in a high precision manner.

The total length of the prior-art fiber optical connector A is too long to meet the length requirements of the cabinet for 5G network. Moreover, when the fiber optical connector is forcedly assembled, the engaging points and engaging grooves of the assembled connector for providing the substantial structural strength of the assembly are damaged, thereby reducing the structural strength of the assembled connector. Furthermore, because the assembling of the optical-fiber cable with the connector requires the jacket of the optical-fiber cable to be teared apart, thereby reducing the protection effect of the jacket for the optical-fiber lines. Moreover, during the use of the optical-fiber cable, the cable may be pulled apart easily to cause function failure. Furthermore, a cross section of the riveted insertion core is of a hexagonal shape and mated with the housing in a tapered engaging manner. As a result, the connector needs a high precision processing, and components of the finished LC connector cannot meet the high precision connection requirements.

In view of these, an embodiment of the instant disclosure provides a fiber optical connector comprising a connector housing and an optical-fiber component. The connector housing comprises a receiving space. One end of the connector housing forms a connector opening communicating with the receiving space. Two side walls of the connector housing comprise a plurality of buckling portions adjacent to the connector opening. The optical-fiber component is positioned in the receiving space. The optical-fiber component comprises a sleeve piece. The sleeve piece comprises a block member and a threaded portion. The block member is assembled in the connector opening and the block member fully received inside the receiving space. two sides of the block member respectively form an engaging portion. Each of the engaging portions is engaged with the corresponding buckling portion, and the threaded portion is exposed on the peripheral surface of a tail portion of the sleeve piece and out of the connector opening.

In one or some embodiments, each of the buckling portions comprises an elastic protruding portion, and the elastic protruding portions are formed on the side walls of the connector housing. Each of the engaging portions comprises a recessed portion formed on a side wall of the sleeve piece.

In one or some embodiments, a length of the sleeve piece is in a range between 6.25 mm and 10.25 mm, and a total length of the fiber optical connector is in a range between 30 mm and 35 mm.

In one or some embodiments, a length of the connector housing is in a range between 8.9 mm and 13.9 mm or in a range between 15.4 mm and 19.4 mm.

In one or some embodiments, the optical-fiber component comprises a base body, an insertion pin, a connection sleeve, a core component and a spring. The base body is received in the receiving space. The insertion pin and the connection sleeve are respectively assembled with two sides of the base body. The core component is fitted over the connection sleeve. The spring is fitted over the core component.

In one or some embodiments, the optical-fiber component comprises a tubular member and a tail cap. The tubular member is fitted over one end of the sleeve piece, the tail cap is fitted over the tubular ember, a length of the tubular member is in a range between 4.5 mm and 8.5 mm, and a length of the tail cap is in a range between 10.7 mm and 14.7 mm.

In one or some embodiments, the tubular member is fitted over the threaded portion. An inner side of the tubular member forms a plurality of barb structures, and the length of the sleeve piece is 8.25 mm.

In one or some embodiments, the block member of the sleeve piece is not exposed out of the connector opening and only the threaded portion of the sleeve piece is exposed out of the connector opening.

In view of these, an embodiment of the instant disclosure provides a fiber optical connector comprising a connector housing and an optical-fiber component. The connector housing comprises a receiving space. One end of the connector housing forms a connector opening communicating with the receiving space. Two side walls of the connector housing comprise a plurality of bucking portions adjacent to the connector opening. The optical-fiber component is positioned in the receiving space. The optical-fiber component comprises a sleeve piece, the sleeve piece comprises a block member assembled in the connector opening. The block member is fully received inside the receiving space. Two sides of the block member respectively form an engaging portion. Each of the engaging portions is engaged with the corresponding buckling portion. The optical-fiber component comprises a tubular member and a tail cap. The tubular member is fitted over one end of the sleeve piece. The tail cap is fitted over the tubular member. A length of the tubular member is in a range between 4.5 mm and 8.5 mm, and a length of the tail cap is in a range between 10.7 mm and 14.7 mm.

In one or some embodiments, the sleeve piece further comprises a threaded portion. The threaded portion is exposed on the peripheral surface of a tail portion of the sleeve piece and out of the connector opening. The tubular member is fitted over the threaded portion. An inner side of the tubular member forms a plurality of barb structures, and the length of the sleeve piece is 8.25 mm.

In one or some embodiments, the block member of the sleeve piece is not exposed out of the connector opening and only the threaded portion of the sleeve piece is exposed out of the connector opening.

In view of these, an embodiment of the instant disclosure provides a fiber optical connector comprising a connector housing and an optical-fiber component. The connector housing comprises a receiving space. One end of the connector housing forms a connector opening communicating with the receiving space. Two side walls of the connector housing comprise a plurality of bucking portions adjacent to the connector opening. The optical-fiber component positioned in the receiving space, wherein the optical-fiber component comprises a sleeve piece. The sleeve piece comprises a block member assembled in the connector opening and the block member fully received inside the receiving space. Two sides of the block member respectively form an engaging portion. Each of the engaging portions is engaged with the corresponding buckling portion. Each of the buckling portions comprises an elastic protruding portion. The elastic protruding portions are formed on the side walls of the connector housing. Each of the engaging portions comprises a recessed portion formed on a side wall of the sleeve piece.

In one or some embodiments, the block member of the sleeve piece is not exposed out of the connector opening and only the threaded portion of the sleeve piece is exposed out of the connector opening.

According to one or some embodiments of the instant disclosure, following benefits can be provided.

The length of the sleeve piece of the prior-art fiber optical connector is 18.22 mm; conversely, in one or some embodiments of the instant disclosure, the length of the sleeve piece is in the range between 6.25 mm and 10.25 mm. In one or some embodiments of the instant disclosure, one of two ends of the sleeve piece is devoid of the protruding tubular member, and the other end of the sleeve piece is devoid of the metallic tubular member. Moreover, in one or some embodiments of the instant disclosure, one end of the sleeve piece is assembled in the connector opening thereby reducing the total length of the fiber optical connector; conversely, the total length of the prior-art fiber optical connector is increased due to the sleeve piece is fixed outside the housing. Accordingly, after the optical-fiber component is assembled with the connector housing, the total length of the fiber optical connector is reduced to be in the range between 30 mm and 35 mm. Therefore, in the cabinet for 5G network transmission program, the space requirements for assembling the fiber optical connector with the optical-fiber cassette can be satisfied, thereby providing more installation space for other components.

The sleeve piece of the optical-fiber component is assembled with the connector housing through engaging, thereby simplifying the assembling of the optical-fiber component and the connector housing. Moreover, during the assembling process, the engaging points of the connector can be protected in advance, allowing the connector to meet a higher pulling force operation condition.

During assembling the optical-fiber cable with the connector, the jacket of the optical-fiber cable is not needed to be teared apart, allowing the jacket to perform a better protection for the optical-fiber lines, and increasing the structural strength of the jacket.

The cross section of the base body and the cross section of the interior of the connector housing are of corresponding rectangle shapes. Hence, the processing for these components is simplified. Moreover, the assembled connector can meet the high precision requirements and the signal transmission requirements for 5G network transmission program.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

Figure 3:
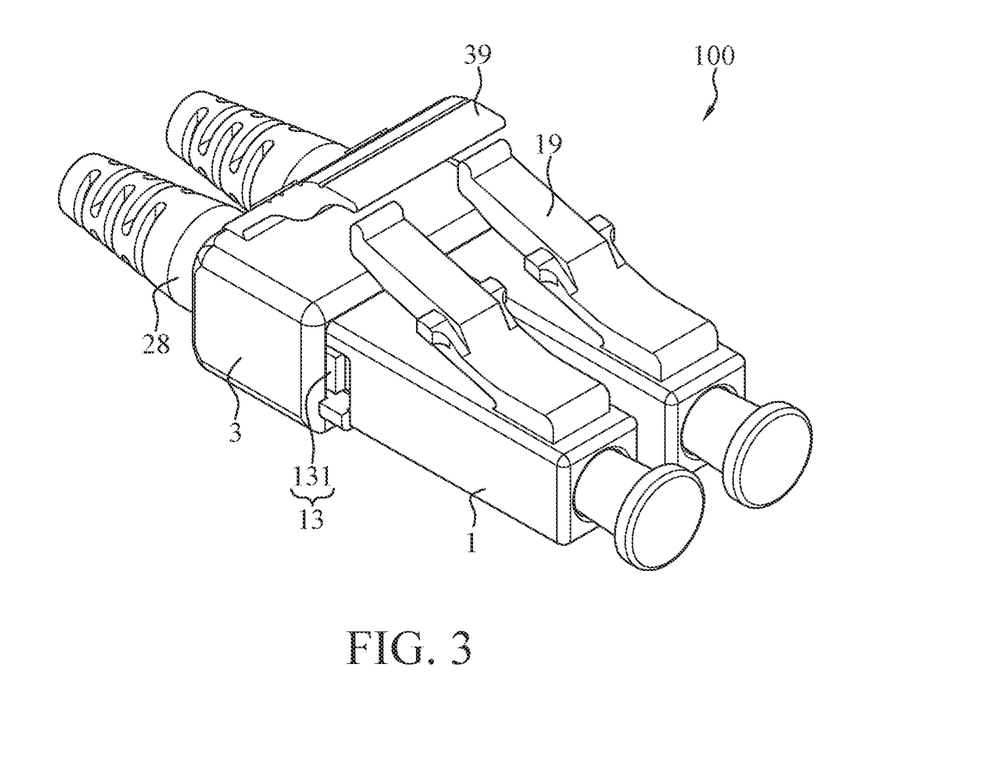
FIG. 3 illustrates a perspective view (1) of a fiber optical connector according to an exemplary embodiment of the instant disclosure.
Figure 4:
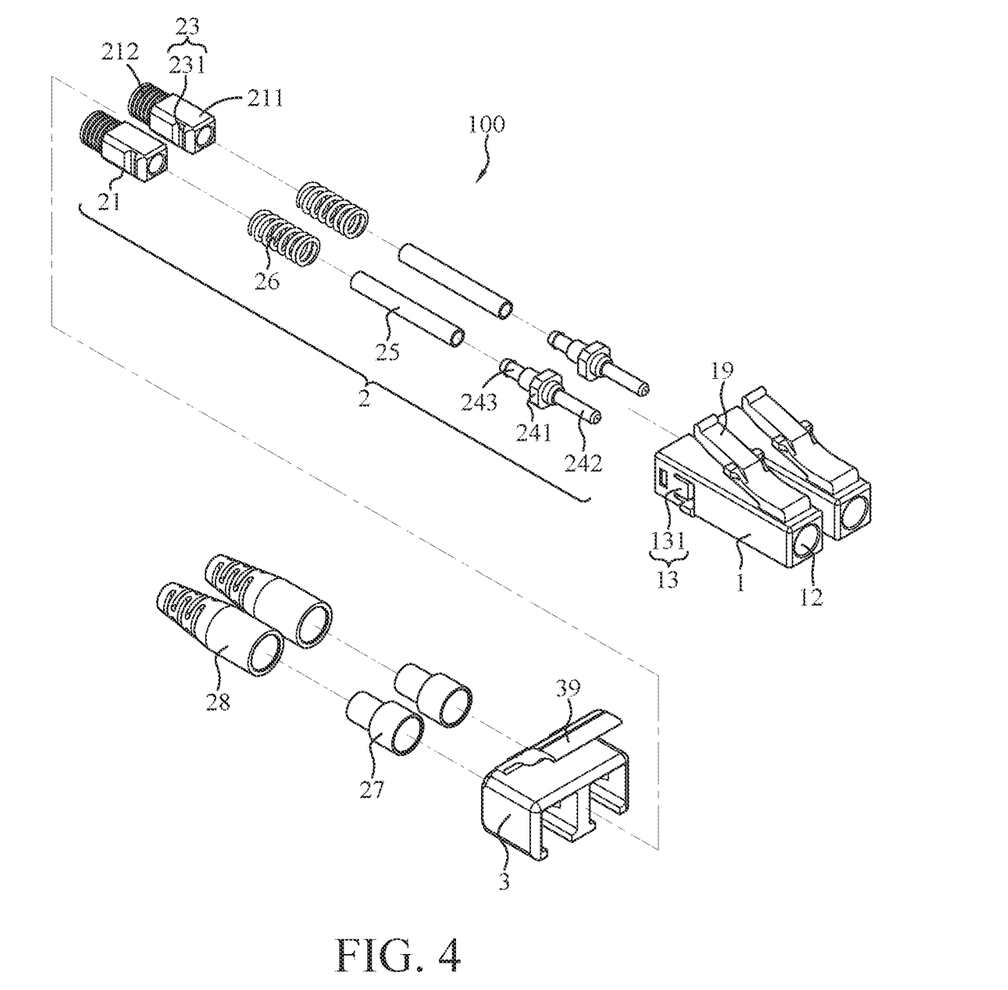
FIG. 4 illustrates an exploded view of the fiber optical connector of the exemplary embodiment.

Please refer to FIGS. 3 and 4. FIG. 3 illustrates a perspective view (1) of a fiber optical connector according to an exemplary embodiment of the instant disclosure, and FIG. 4 illustrates an exploded view of the fiber optical connector according to the exemplary embodiment. FIGS. 3 and 4 illustrates the exemplary embodiment for the fiber optical connector 100. In this embodiment, the fiber optical connector 100 comprises a plurality of connector housings 1 and a plurality of optical-fiber components 2, but embodiments are not limited thereto; in some embodiments, the fiber optical connector 100 comprises one connector housing 1 and one optical-fiber component 2.

Figure 8:
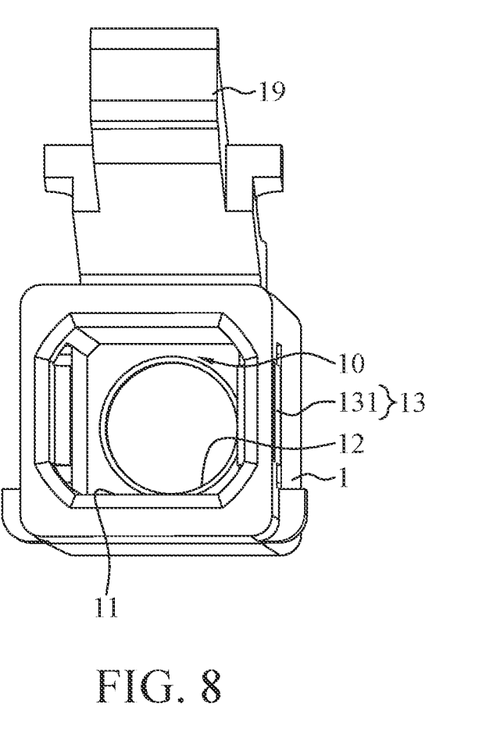
FIG. 8 illustrates a perspective view of a connector housing of the fiber optical connector of the exemplary embodiment.

Please refer to FIGS. 3, 4, and 8, where FIG. 8 illustrates a perspective view of the connector housing 1. In this embodiment, the connector housing 1 comprises a receiving space 10. One end of the connector housing 1 forms a connector opening 11 communicating with the receiving space 10, and two side walls of the connector housing 1 comprise a plurality of buckling portions 13 adjacent to the connector opening 11. The length of the connector housing 1 may be in a range between 8.9 mm and 13.9 mm or between 15.4 mm and 19.4 mm; preferably, in one embodiment, the length of the connector housing 1 may be 11.9 mm or 17.4 mm.

Figure 9:
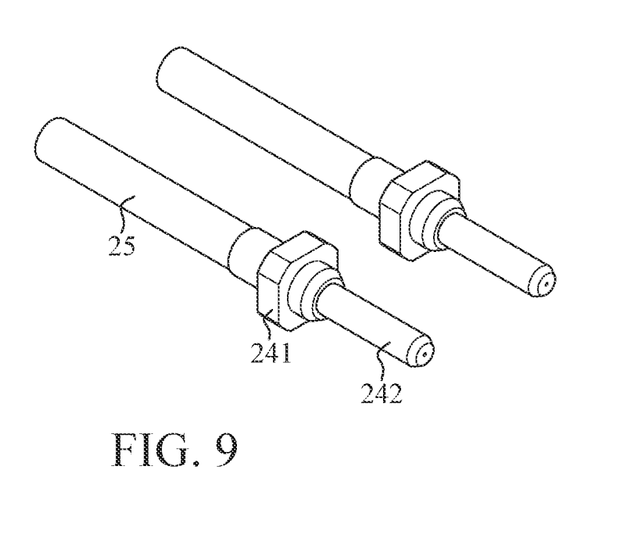
FIG. 9 illustrates a perspective view (1) of parts of the components of the fiber optical connector of the exemplary embodiment.
Figure 10:
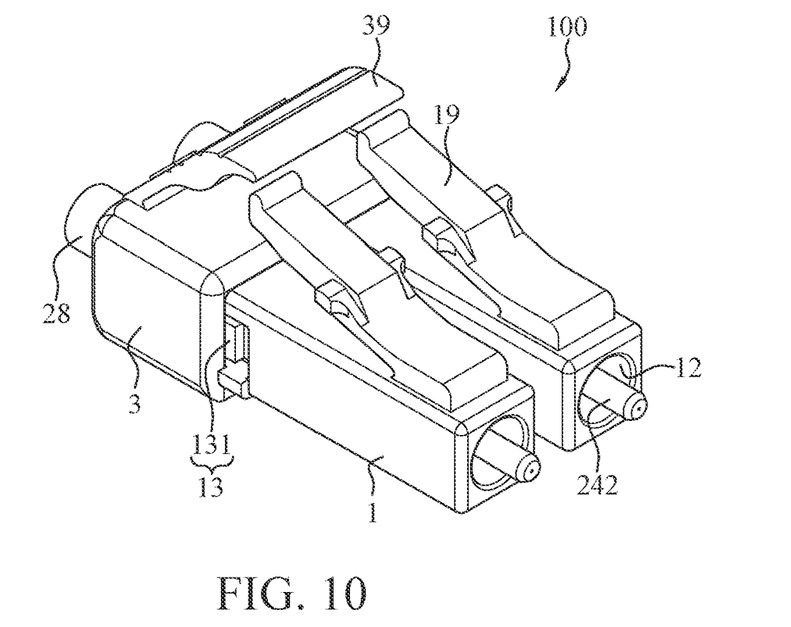
FIG. 10 illustrates a perspective view (2) of parts of the components of the fiber optical connector of the exemplary embodiment.
Figure 11:
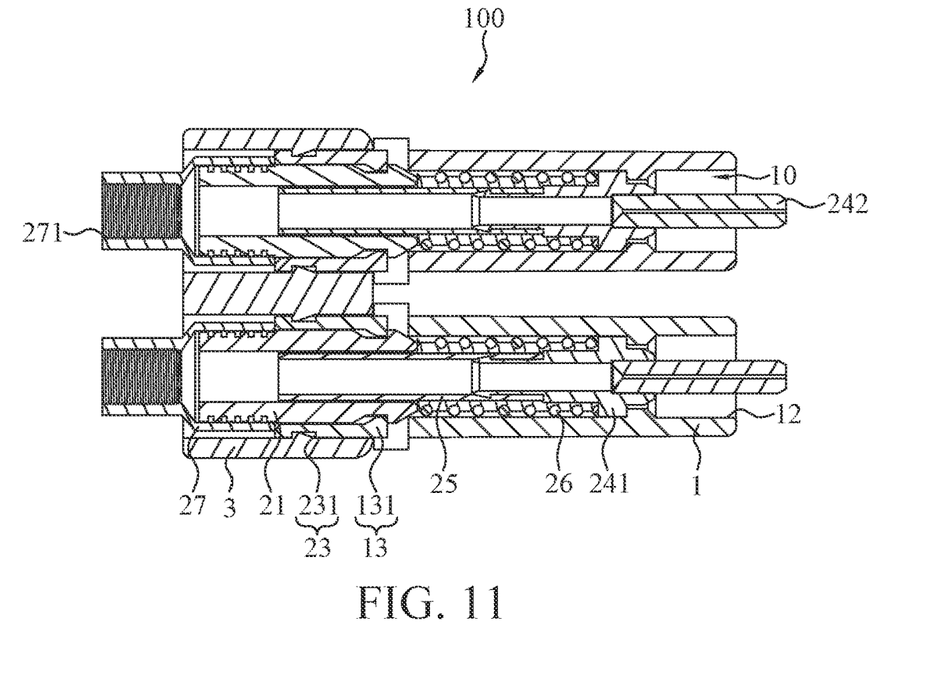
FIG. 11 illustrates a top cross-sectional view of FIG. 10.

Please refer to FIGS. 3 to 5 and FIGS. 9 to 11, where FIG. illustrates a side cross-sectional view of the fiber optical connector 100, FIG. 9 illustrates a perspective view (1) of parts of the components of the fiber optical connector 100, FIG. 10 illustrates a perspective view (2) of parts of the components of the fiber optical connector 100, and FIG. 11 illustrates a top cross-sectional view of FIG. 10. In this embodiment, the optical-fiber component 2 passes through the receiving space 10. The optical-fiber component 2 comprises a sleeve piece 21. One of two ends of the sleeve piece 21 is in the connector opening 11, and the other end of the sleeve piece 21 is exposed out of the connector opening 11. In this embodiment, the sleeve piece 21 comprises a block member 211 and a threaded portion 212 integrally formed with each other. In detail, the block member 211 is directly connected to the threaded portion 212, and the block member 211 and the thread portion 212 are at two ends of the sleeve piece 21.

In this embodiment, the block member 211 is approximately of a rectangular block structure. The block member 211 is positioned in the connector opening 11. It is understood that, in this embodiment, the block member 211 is of a rectangular structure, so that the block member 211 can be assembled in the connector opening 11 at the interior of the connector housing 1 whose cross section is of a rectangle shape as well. The block member 211 is fully received inside the receiving space 10 to shorten a total length L2 of the fiber connector.

In this embodiment, the threaded portion 212 is a cylindrical body, and an outer threaded pattern are formed on the cylindrical body, the outer threaded pattern is threaded with an inner surface of a tubular member 27 of the optical-fiber component 2. Moreover, the threaded portion 212 is exposed on the peripheral surface of a tail portion of the sleeve piece 21 and out of the connector opening 11. In this embodiment, the length of the sleeve piece 21 is in a range between 6.25 mm and 10.25 mm. Preferably, in one embodiment, the length of the sleeve piece 21 may be 8.25 mm.

By comparing the connectors respectively shown in FIGS. 1 and 4, it is understood that, one of two ends of the sleeve piece 21 of the fiber optical connector 100 in this embodiment is devoid of the protruding tubular member C41 of the prior-art fiber optical connector A, and the other end of the sleeve piece 21 of the fiber optical connector 100 in this embodiment is devoid of the metallic tubular member C43 of the prior-art fiber optical connector A. In this embodiment, the main body (rectangular block) and the protruding tubular member C41 (tubular body) of the sleeve piece C4 shown in the prior art are integrated to be the one-piece structure (the block member 211) of the sleeve piece 21, thereby improving the structural strength of the sleeve piece 21.

In this embodiment, one of two ends of the sleeve piece 21 is inserted into the connector opening 11 of the connector housing 1. Two sides of the sleeve piece 21 form engaging portions 23. Each of the engaging portions 23 is engaged with the corresponding buckling portion 13. During the assembling process for the connector, the buckling portions 13 and the engaging portions 23 (engaging points) can be protected in advance.

Please refer to FIGS. 3, 4, and 9 to 11. More specifically, in this embodiment, each of the buckling portions 13 comprises an elastic protruding portion 131, and the elastic protruding portions 131 are formed on the side walls of the connector housing 1. Moreover, each of the engaging portions 23 comprises a recessed portion 231 formed on a side wall of the sleeve piece 21. Accordingly, when the sleeve piece 21 is assembled in the connector opening 11, the hook of the elastic protruding portion 131 is mated with the recessed portion 231 in a flexible engaging manner. Moreover, upon the sleeve piece 21 is assembled in the connector housing 1, the elastic protruding portions 131 are pushed by the sleeve piece 21 so as to be deflected outwardly in a flexible manner, so that the hooks of the elastic protruding portions 131 are temporarily moved out of the receiving space 10, facilitating the insertion of the sleeve piece 21.

In some embodiments, the positions of the elastic protruding portions 131 and the recessed portions 231 may be exchanged. In other words, in these embodiments, each of the buckling portions 13 may comprise a recessed portion, and the recessed portions are formed on the side walls of the connector housing 1; each of the engaging portions 23 may comprise an elastic protruding portion formed on the side wall of the sleeve piece 21, and the elastic protruding portion is mated with the recessed portion in a flexible engaging manner.

Please refer to FIGS. 3, 4, and 9 to 11. In this embodiment, more specifically, the optical-fiber component 2 comprises a base body 241, an insertion pin 242, and a connection sleeve 243. The base body 241 is received in the receiving space 10, and the insertion pin 242 and the connection sleeve 243 are respectively assembled with two sides of the base body 241. The front end of the insertion pin 242 is exposed out of an insertion opening 12 at the front end of the connector housing 1, and the connection sleeve 243 is in the receiving space 10

Figure 7:
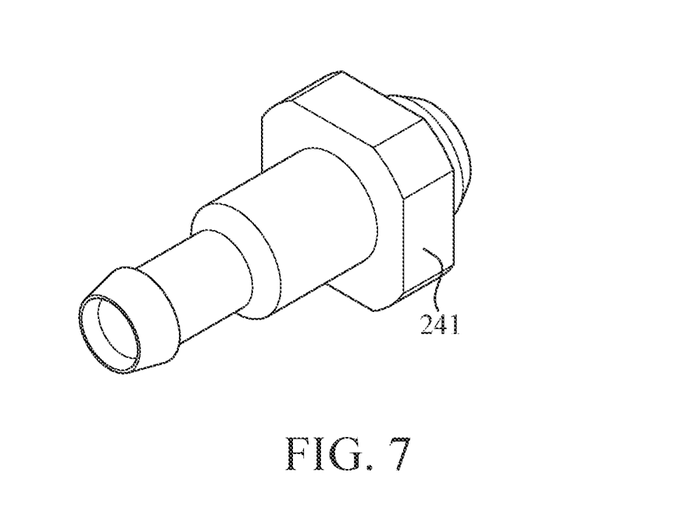
FIG. 7 illustrates a perspective view of a base body of the fiber optical connector of the exemplary embodiment.

Please refer to FIGS. 4, 7, and 9 to 11, where FIG. 7 illustrates a perspective view of the base body 241. In this embodiment, more specifically, a cross section of the base body 241 is of a geometrical shape, and a cross section of the interior of the connector housing 1 is of a geometrical shape corresponding to the geometrical shape of the cross section of the base body 241. In this embodiment, the cross section of the base body 241 is of a rectangle shape, and the cross section of the interior of the connector housing 1 is of a rectangle shape as well. Hence, when the base body 241 is assembled in the connector housing 1, four surfaces of the base body 241 are respectively limited and positioned by four inner surfaces of the connector housing 1. In some embodiments, the cross section of the base body 241 may be of a triangle shape, a pentagon shape, or the like, and the cross section of the interior of the connector housing 1 may correspond to the cross section of the base body 241 and may be of a triangle shape, a pentagon shape, or the like.

Figure 5:
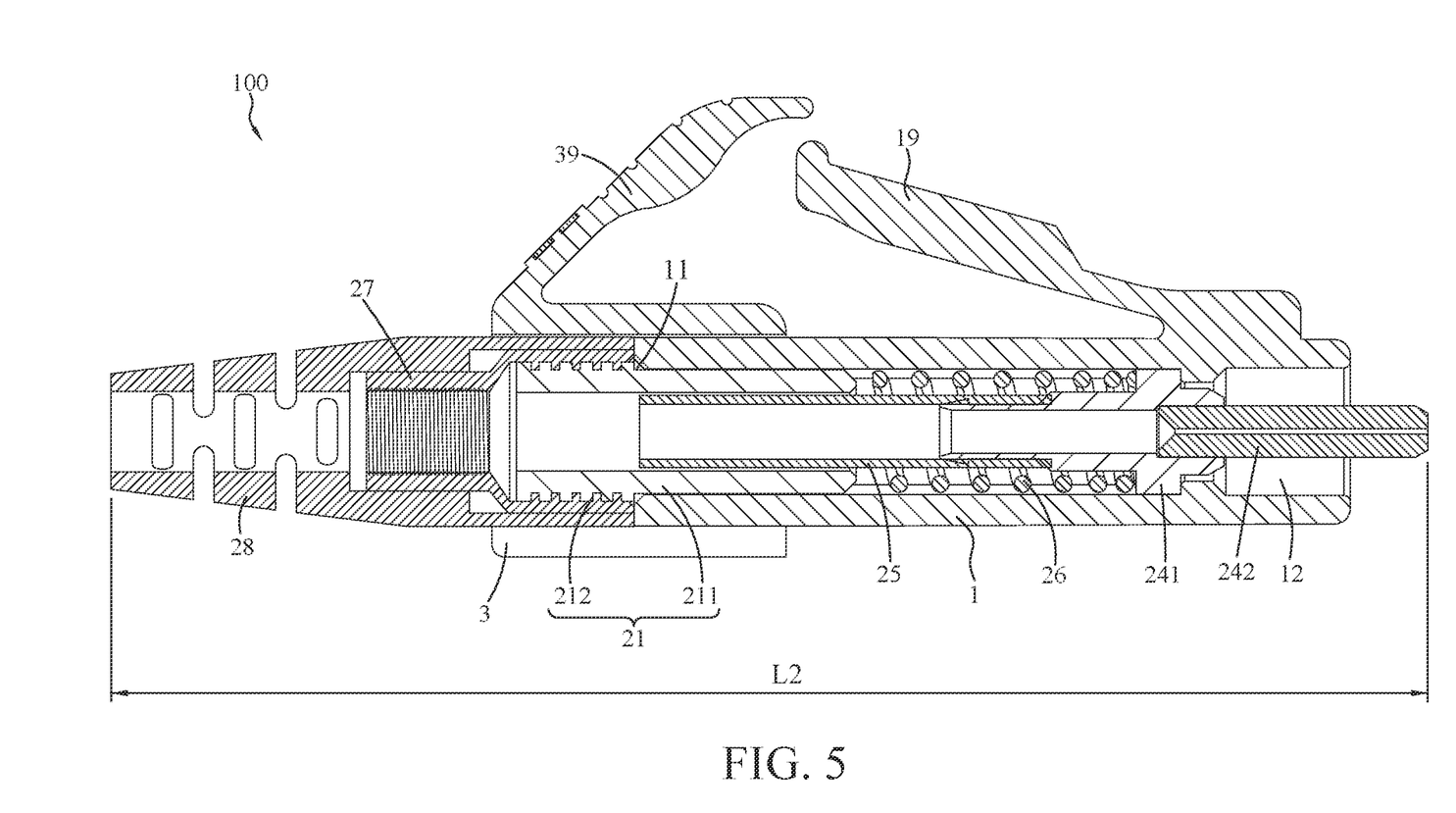
FIG. 5 illustrates a side cross-sectional view of the fiber optical connector of the exemplary embodiment.

Please refer to FIGS. 4, 5, and 11. More specifically, in this embodiment, the optical-fiber component 2 comprises a core component 25 and a spring 26. The core component 25 is fitted over the connection sleeve 243, and the spring 26 is fitted over the core component 25. The core component 25 is adapted to enclose an optical fiber cable, and two ends of the spring 26 are respectively abutted against the base body 241 and the sleeve piece 21.

Figure 6:
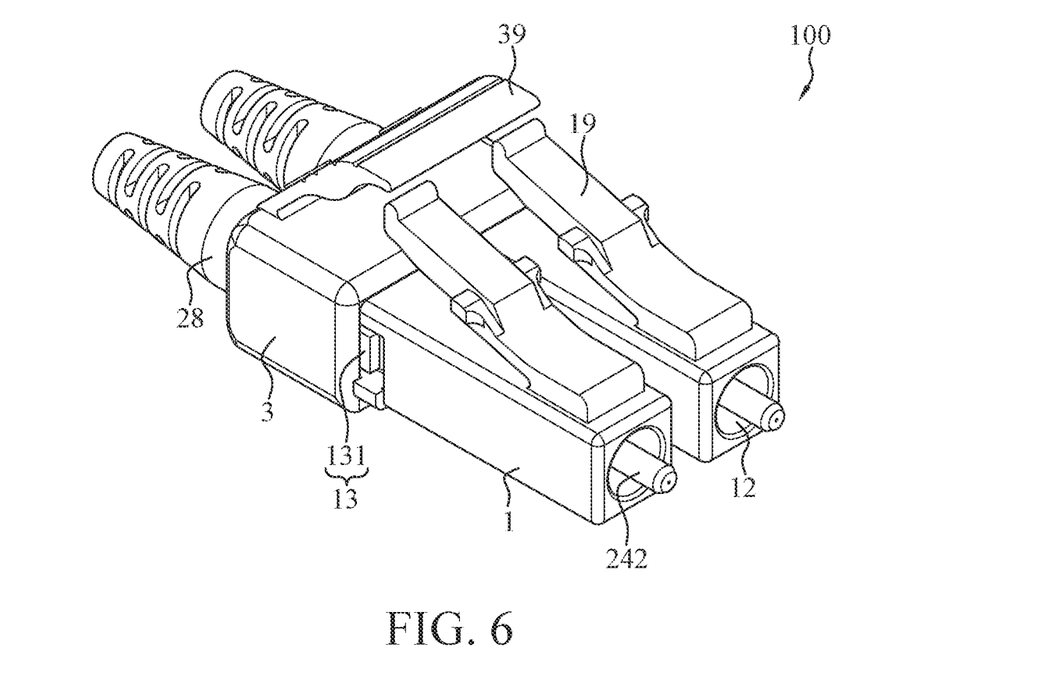
FIG. 6 illustrates a perspective view (2) of the fiber optical connector of the exemplary embodiment.

Please refer to FIGS. 4, 6, and 11, where FIG. 6 illustrates a perspective view (2) of the fiber optical connector 100 of the exemplary embodiment. More specifically, in this embodiment, the optical-fiber component 2 comprises a tubular member 27 and a tail cap 28. The tubular member 27 is fitted over the other end of the sleeve piece 21; that is, in this embodiment, the tubular member 27 is fitted over the threaded portion 212, and the tail cap 28 is fitted over the tubular member 27. Moreover, the tubular member 27 may be fixed at the other end of the sleeve piece 21 by crimp connection.

Please refer to FIGS. 3 to 5. A length L2 between the front end of the insertion pin 242 and the rear end of the tail cap 28 is in a range between 30 mm and 35 mm. In other words, the length L2 of the entire fiber optical connector 100 is in the range between 30 mm and 35 mm. Moreover, the length of the tubular member 27 is in a range between 4.5 mm and 8.5 mm; preferably in one embodiment, the length of the tubular member 27 is 6.5 mm. the length of the tail cap 28 is in a range between 10.7 mm and 14.7 mm; preferably in one embodiment, the length of the tail cap 28 is 12.7 mm.

Figure 12:
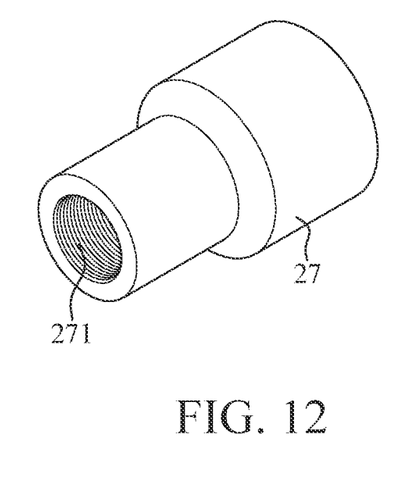
FIG. 12 illustrates a perspective view of a tubular member of the fiber optical connector of the exemplary embodiment.
Figure 13:
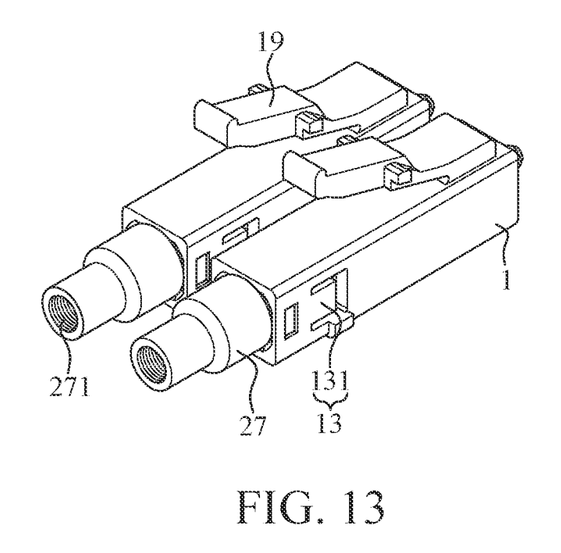
FIG. 13 illustrates a perspective view (3) of parts of the component s of the fiber optical connector of the exemplary embodiment.

Please refer to FIGS. 4, 12, and 13, where FIG. 12 illustrates a perspective view of the tubular member 27 and FIG. 13 illustrates a perspective view (3) of parts of the components of the fiber optical connector 100. More specifically, in this embodiment, an inner side of the tubular member 27 forms a plurality of barb structures 271. In this embodiment, the barb structures 271 are inner thread patterns for positioning the optical-fiber cable and providing an anti-skid function. Hence, during assembling the optical-fiber cable with the connector, the jacket of the optical-fiber cable is not needed to be teared apart, and the optical-fiber cable can be directly fixed on the barb structures 271 by crimp connection.

Please refer to FIGS. 3 and 4. More specifically, in this embodiment, the connector housing 1 comprises an elastic arm 19 obliquely and outwardly extending from an outer surface of the connector housing 1. Moreover, the fiber optical connector 100 further comprises a crimp connection block 3 fitted over the connector housing 1. The crimp connection block 3 comprises an elastic piece 39 obliquely and outwardly extending from an outer surface of the crimp connection block 3 and above the elastic arm 19. When several connector housings 1 and several optical-fiber components 2 are used for assembling the fiber optical connector 100, the connector housings 1 and the optical-fiber components 2 are respectively aligned side by side, and the crimp connection block 3 is fitted out of the connector housings 1.

When the elastic piece 39 is pressed, the elastic piece 39 is deflected by taking the surface of the crimp connection block 3 as the deflection center, and then the end portion of the elastic piece 39 is in contact with the end portion of the elastic arm 19, so that the elastic piece 39 drives the elastic arm 19 to move downwardly. Hence, the engaging block on the elastic arm 19 is detached from a device (e.g., an optical-fiber cassette) buckled with the fiber optical connector 100, so that the fiber optical connector 100 can be detached from the device.

According to one or some embodiments of the instant disclosure, following benefits can be provided.

The length of the sleeve piece C4 of the prior-art fiber optical connector A is 18.22 mm; conversely, in one or some embodiments of the instant disclosure, the length of the sleeve piece 21 is in the range between 6.25 mm and 10.25 mm. In one or some embodiments of the instant disclosure, one of two ends of the sleeve piece 21 is devoid of the protruding tubular member C41 described in the prior-art fiber optical connector A, and the other end of the sleeve piece 21 is devoid of the metallic tubular member C43 described in the prior-art fiber optical connector A. Moreover, in one or some embodiments of the instant disclosure, one end of the sleeve piece 21 is assembled in the connector opening 11 thereby reducing the total length of the fiber optical connector 100; conversely, the total length of the prior-art fiber optical connector A is increased due to the sleeve piece C4 is fixed outside the housing B. Accordingly, after the optical-fiber component 2 is assembled with the connector housing 1, the total length L2 of the fiber optical connector 100 is reduced to be in the range between 30 mm and 35 mm. Therefore, in the cabinet for 5G network transmission program, the space requirements for assembling the fiber optical connector 100 with the optical-fiber cassette can be satisfied, thereby providing more installation space for other components.

The sleeve piece 21 of the optical-fiber component 2 is assembled with the connector housing 1 through engaging, thereby simplifying the assembling of the optical-fiber component 2 and the connector housing 1. Moreover, during the assembling process, the engaging points of the connector can be protected in advance, allowing the connector to meet a higher pulling force operation condition.

During assembling the optical-fiber cable with the connector, the jacket of the optical-fiber cable is not needed to be teared apart, allowing the jacket to perform a better protection for the optical-fiber lines, and increasing the structural strength of the jacket.

The cross section of the base body 241 and the cross section of the interior of the connector housing 1 are of corresponding rectangle shapes. Hence, the processing for these components is simplified. Moreover, the assembled connector can meet the high precision requirements and the signal transmission requirements for 5G network transmission program.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A fiber optical connector, comprising:
    a connector housing comprising a receiving space, wherein one end of the connector housing forms a connector opening communicating with the receiving space, and two side walls of the connector housing comprise a plurality of bucking portions adjacent to the connector opening; and
    an optical-fiber component positioned in the receiving space, wherein the optical-fiber component comprises a sleeve piece, the sleeve piece comprises a block member and a threaded portion, the block member is directly connected to the threaded portion, and the block member and the thread portion are at two ends of the sleeve piece, the block member is assembled in the connector opening and the block member fully received inside the receiving space, two sides of the block member respectively form an engaging portion, each of the engaging portions is engaged with the corresponding buckling portion, and the threaded portion is exposed on the peripheral surface of a tail portion of the sleeve piece and out of the connector opening, and wherein the optical-fiber component comprises a base body, an insertion pin, a connection sleeve, a core component and a spring, the base body is received in the receiving space, the insertion pin and the connection sleeve are respectively assembled with two sides of the base body, the core component is fitted over the connection sleeve, and the spring is fitted over the core component.

2. The fiber optical connector according to claim 1, wherein each of the buckling portions comprises an elastic protruding portion, and the elastic protruding portions are formed on the side walls of the connector housing; each of the engaging portions comprises a recessed portion formed on a side wall of the sleeve piece.

3. The fiber optical connector according to claim 1, wherein a length of the sleeve piece is in a range between 6.25 mm and 10.25 mm, and a total length of the fiber optical connector is in a range between 30 mm and 35 mm.

4. The fiber optical connector according to claim 1, wherein a length of the connector housing is in a range between 8.9 mm and 13.9 mm or in a range between 15.4 mm and 19.4 mm.

5. The fiber optical connector according to claim 1, wherein the optical-fiber component comprises a tubular member and a tail cap, the tubular member is fitted over one end of the sleeve piece, the tail cap is fitted over the tubular member, a length of the tubular member is in a range between 4.5 mm and 8.5 mm, and a length of the tail cap is in a range between 10.7 mm and 14.7 mm.

6. The fiber optical connector according to claim 5, wherein the tubular member is fitted over the threaded portion, an inner side of the tubular member forms a plurality of barb structures, and the length of the sleeve piece is 8.25 mm.

7. The fiber optical connector according to claim 1, wherein the block member of the sleeve piece is not exposed out of the connector opening and only the threaded portion of the sleeve piece is exposed out of the connector opening.

8. A fiber optical connector, comprising:
    a connector housing comprising a receiving space, wherein one end of the connector housing forms a connector opening communicating with the receiving space, and two side walls of the connector housing comprise a plurality of bucking portions adjacent to the connector opening; and
    an optical-fiber component positioned in the receiving space, wherein the optical-fiber component comprises a sleeve piece, the sleeve piece comprises a block member assembled in the connector opening and the block member is fully received inside the receiving space, two sides of the block member respectively form an engaging portion, and each of the engaging portions is engaged with the corresponding buckling portion, wherein the optical-fiber component comprises a tubular member and a tail cap, the tubular member is fitted over one end of the sleeve piece, the tail cap is fitted over the tubular member, a length of the tubular member is in a range between 4.5 mm and 8.5 mm, and a length of the tail cap is in a range between 10.7 mm and 14.7 mm, and wherein the optical-fiber component comprises a base body, an insertion pin, a connection sleeve, a core component and a spring, the base body is received in the receiving space, the insertion pin and the connection sleeve are respectively assembled with two sides of the base body, the core component is fitted over the connection sleeve, and the spring is fitted over the core component.

9. The fiber optical connector according to claim 8 wherein the sleeve piece further comprises a threaded portion, wherein the threaded portion is exposed on the peripheral surface of a tail portion of the sleeve piece and out of the connector opening, the tubular member is fitted over the threaded portion, an inner side of the tubular member forms a plurality of barb structures, and the length of the sleeve piece is 8.25 mm.

10. The fiber optical connector according to claim 9, wherein the block member of the sleeve piece is not exposed out of the connector opening and only the threaded portion of the sleeve piece is exposed out of the connector opening.

11. A fiber optical connector, comprising:
    a connector housing comprising a receiving space, wherein one end of the connector housing forms a connector opening communicating with the receiving space, and two side walls of the connector housing comprise a plurality of bucking portions adjacent to the connector opening; and
    an optical-fiber component positioned in the receiving space, wherein the optical-fiber component comprises a sleeve piece, the sleeve piece comprises a block member and a threaded portion, the block member is directly connected to the threaded portion, and the block member and the thread portion are at two ends of the sleeve piece, the block member is assembled in the connector opening and the block member fully received inside the receiving space, two sides of the block member respectively form an engaging portion, and each of the engaging portions is engaged with the corresponding buckling portion, wherein each of the buckling portions comprises an elastic protruding portion, and the elastic protruding portions are formed on the side walls of the connector housing; each of the engaging portions comprises a recessed portion formed on a side wall of the sleeve piece, and wherein the optical-fiber component comprises a base body, an insertion pin, a connection sleeve, a core component and a spring, the base body is received in the receiving space, the insertion pin and the connection sleeve are respectively assembled with two sides of the base body, the core component is fitted over the connection sleeve, and the spring is fitted over the core component.

12. The fiber optical connector according to claim 11, wherein the block member of the sleeve piece is not exposed out of the connector opening and only the threaded portion of the sleeve piece is exposed out of the connector opening.

\* \* \* \* \*